US011926486B2

(12) United States Patent
Asanuma

(10) Patent No.: US 11,926,486 B2
(45) Date of Patent: Mar. 12, 2024

(54) CONVEYANCE ASSISTING APPARATUS, CONVEYANCE APPARATUS, AND PACKAGING SORTING APPARATUS

(71) Applicants: KABUSHIKI KAISHA TOSHIBA, Tokyo (JP); Toshiba Infrastructure Systems & Solutions Corporation, Kawasaki (JP)

(72) Inventor: Reiya Asanuma, Tokyo (JP)

(73) Assignees: Kabushiki Kaisha Toshiba, Tokyo (JP); Toshiba Infrastructure Systems & Solutions Corporation, Kawasaki (JP)

(*) Notice: Subject to any disclaimer, the term of this patent is extended or adjusted under 35 U.S.C. 154(b) by 76 days.

(21) Appl. No.: 17/865,309

(22) Filed: Jul. 14, 2022

(65) Prior Publication Data

US 2022/0348417 A1    Nov. 3, 2022

Related U.S. Application Data

(63) Continuation of application No. PCT/JP2021/002663, filed on Jan. 26, 2021.

(30) Foreign Application Priority Data

Jan. 31, 2020  (JP) ................... 2020-015800

(51) Int. Cl.
*B65G 47/46*  (2006.01)
*B07C 3/08*   (2006.01)
(Continued)

(52) U.S. Cl.
CPC .............. *B65G 47/46* (2013.01); *B07C 3/08* (2013.01); *B65G 17/10* (2013.01); *B65G 47/38* (2013.01); *B65G 47/94* (2013.01); *B65G 47/96* (2013.01)

(58) Field of Classification Search
CPC ........ B65G 47/38; B65G 47/40; B65G 47/94; B65G 47/945; B65G 47/95; B65G 47/96;
(Continued)

(56) References Cited

U.S. PATENT DOCUMENTS 5,588,520 A * 12/1996 Affaticati ............... B65G 47/31
                                                      198/502.2
6,112,879 A    9/2000 Fortenbery et al.
(Continued)

FOREIGN PATENT DOCUMENTS

JP    H5 32316 A      2/1993
JP    H8-324768 A    12/1996
(Continued)

OTHER PUBLICATIONS

Japan Patent Office, International Search Report in PCT/JP2021/002663 (dated Apr. 6, 2021).

*Primary Examiner* — Mark A Deuble
(74) *Attorney, Agent, or Firm* — Finnegan, Henderson, Farabow, Garrett & Dunner, LLP

(57) ABSTRACT

According to an embodiment, a conveyance assisting apparatus includes a placement portion, a base portion, a support portion, a moving device, and a projecting portion. The placement portion has a placement surface on which a package is placed. The base portion is fixed to a conveyance apparatus including a door portion to be opened/closed between a closed-position and an open-position. The support portion is on the base portion and supports the placement portion so that the placement portion is movable in a first-direction between a first-position where the placement portion covers the door portion and a second-position where the placement portion uncovers the door portion. The moving device is on the base portion and configured to move the placement portion. The projecting portion is on the place-
(Continued)

ment surface and extends in a second direction intersecting the first direction.

5 Claims, 9 Drawing Sheets

(51) Int. Cl.
 *B65G 17/10* (2006.01)
 *B65G 47/38* (2006.01)
 *B65G 47/94* (2006.01)
 *B65G 47/96* (2006.01)

(58) Field of Classification Search
 CPC .. B65G 47/962; B65G 47/965; B65G 47/967; B65G 47/46; B65G 17/10; B07C 3/08
 USPC ......................................... 198/370.01–370.1
 See application file for complete search history.

(56) References Cited

U.S. PATENT DOCUMENTS

| | | | |
|---|---|---|---|
| 6,762,382 B1 * | 7/2004 | Danelski | B65G 17/002 209/912 |
| 6,820,561 B2 * | 11/2004 | Soldavini | B65G 17/345 700/218 |
| 6,897,395 B2 * | 5/2005 | Shiibashi | B07C 3/082 209/707 |
| 9,493,308 B2 * | 11/2016 | Hoynash | B07C 5/34 |
| 9,962,743 B2 * | 5/2018 | Bombaugh | B65G 47/44 |
| 10,065,807 B1 * | 9/2018 | Garrett | B07C 5/36 |
| 10,633,189 B2 | 4/2020 | Fumagalli et al. | |
| 11,772,131 B2 * | 10/2023 | Süss | B65G 47/46 209/552 |
| 2005/0133345 A1 | 6/2005 | Veit et al. | |
| 2022/0105543 A1 | 4/2022 | Usami et al. | |

FOREIGN PATENT DOCUMENTS

| | | |
|---|---|---|
| JP | H9-20340 A | 1/1997 |
| JP | 2002-321810 A | 11/2002 |
| JP | 2004-189268 A | 7/2004 |
| JP | 2008-56251 A | 3/2008 |
| JP | 2019-108226 A | 7/2019 |
| JP | 2021-1065 A | 1/2021 |
| JP | 2021-1066 A | 1/2021 |

* cited by examiner

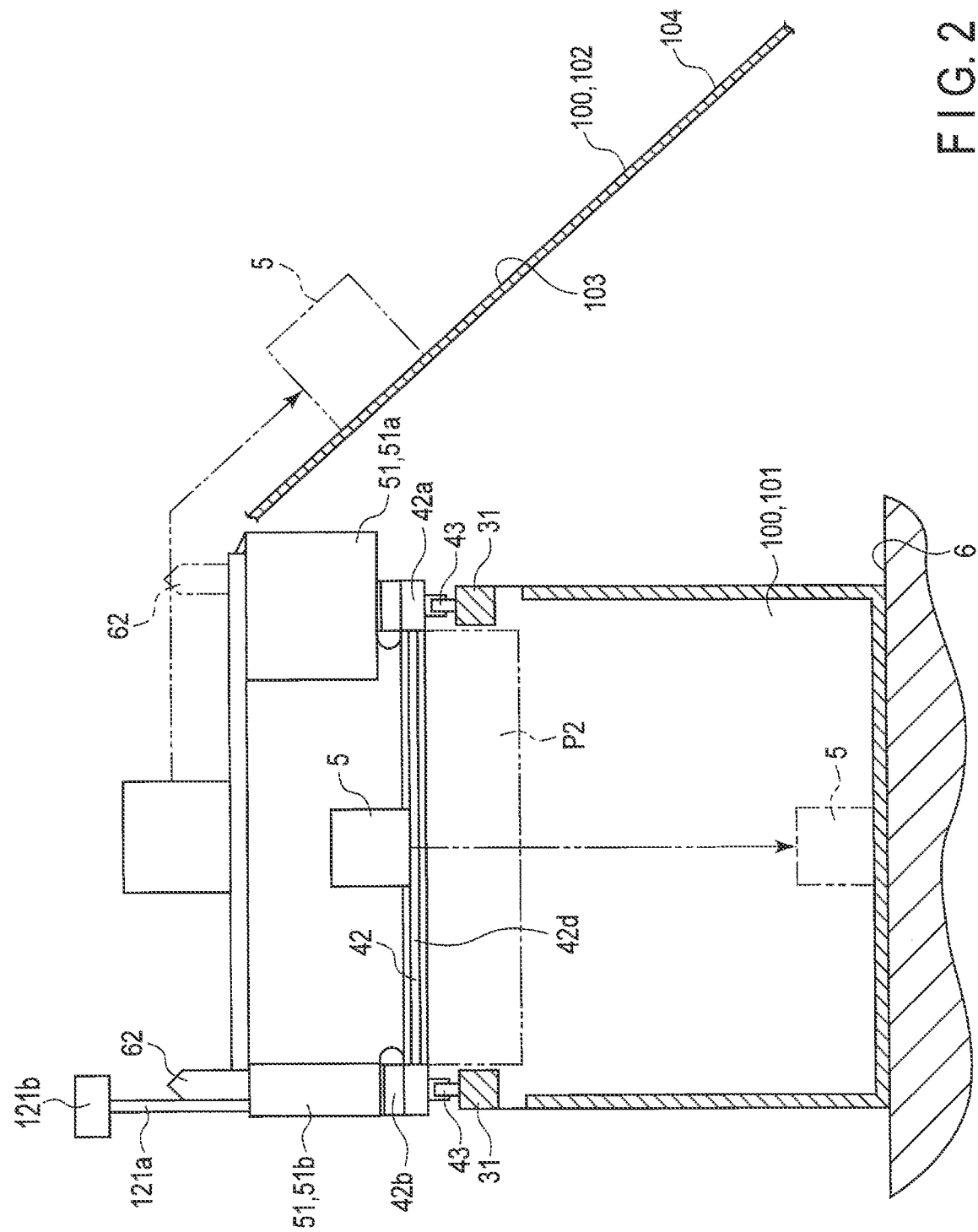
F I G. 2

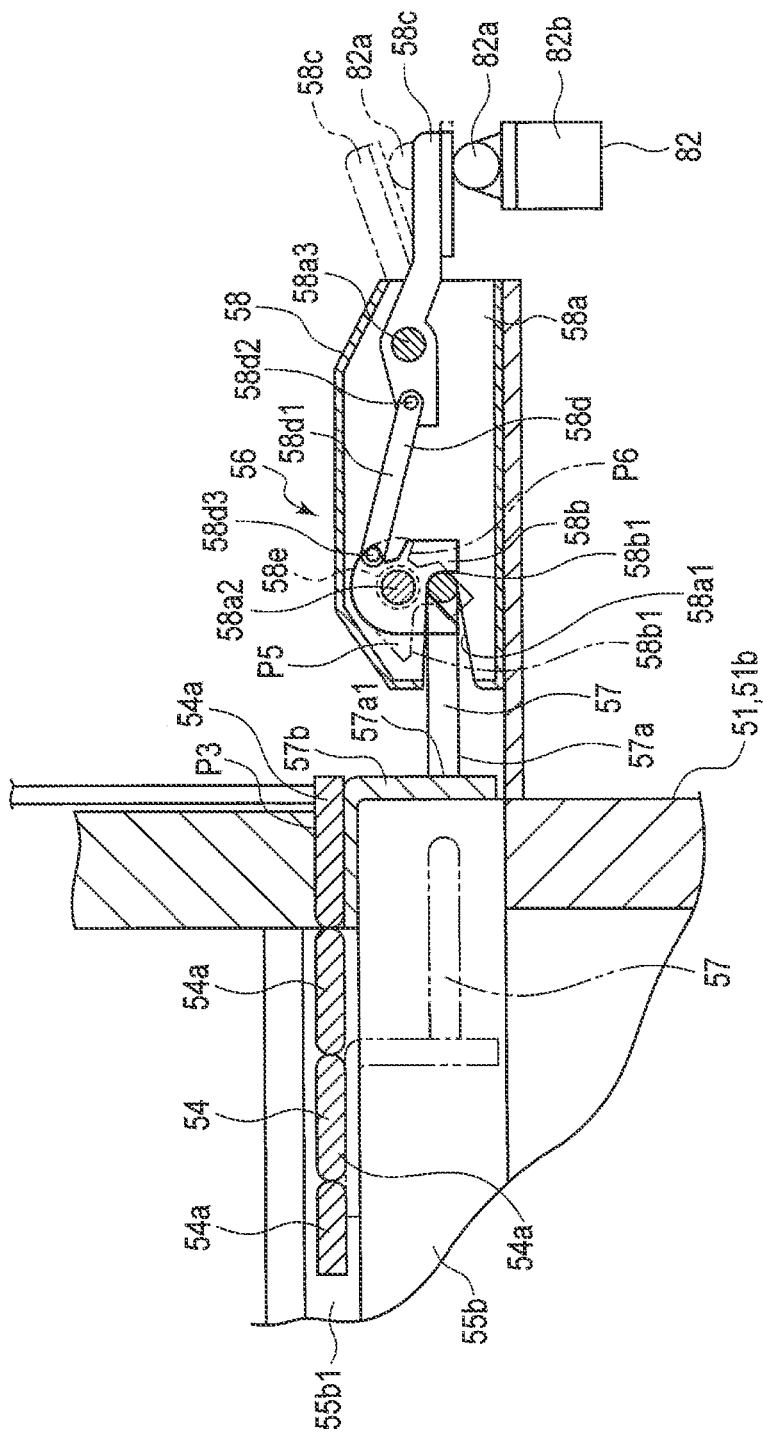
F I G. 6

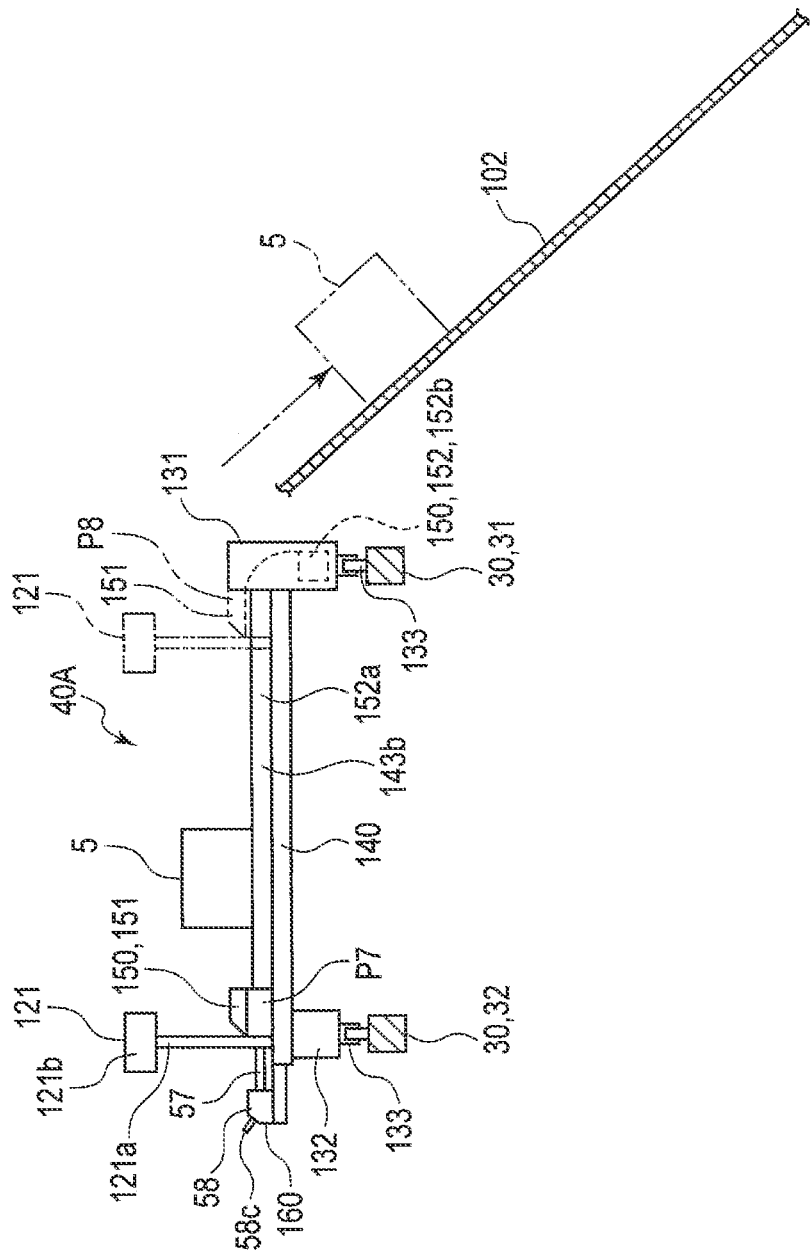
F I G. 9

CONVEYANCE ASSISTING APPARATUS, CONVEYANCE APPARATUS, AND PACKAGING SORTING APPARATUS

CROSS-REFERENCE TO RELATED APPLICATIONS

This application is a Continuation Application of PCT Application No. PCT/JP2021/002663, filed Jan. 26, 2021, and based upon and claiming the benefit of priority from prior Japanese Patent Application No. 2020-015800, filed Jan. 31, 2020, the entire contents of all of which are incorporated herein by reference.

FIELD

Embodiments of the present invention relate to a conveyance assisting apparatus, a conveyance apparatus, and a package sorting apparatus.

BACKGROUND

A package sorting apparatus that sorts a plurality of packages in accordance with their conveyance destinations in a package conveyance process is known. As a package sorting apparatus, a configuration including a so-called bomb-bay tray for feeding a package into a chute provided below a rail when a placement portion on which the package is placed is opened is known.

BRIEF DESCRIPTION OF THE DRAWINGS

FIG. 2 is a cross-sectional view illustrating a configuration of the package sorting apparatus.

FIG. 6 is a cross-sectional view illustrating a configuration of an engaged portion and an engaging device of the conveyance apparatus, and a second releasing device.

FIG. 9 is a side view illustrating the configuration of the conveyance apparatus.

DETAILED DESCRIPTION

An object of an embodiment is to provide a conveyance assisting apparatus, a conveyance apparatus, and a package sorting apparatus capable of improving a degree of freedom in arrangement of chutes.

According to the embodiment, a conveyance assisting apparatus includes a placement portion, a base portion, a support portion, a moving device, and a projecting portion. The placement portion has a placement surface on which a package is placed. The base portion is fixed to a conveyance apparatus including a door portion that is configured to be opened and closed between a closed position where the package is placed on the door portion and an open position where the package is dropped. The support portion is provided on the base portion and supports the placement portion so that the placement portion is movable in a first direction between a first position where the placement portion covers the door portion and a second position where the placement portion uncovers the door portion. The moving device is provided on the base portion and is configured to move the placement portion. The projecting portion is provided on the placement surface and extends in a second direction intersecting the first direction.

A package sorting apparatus 10 according to an embodiment will be described with reference to FIGS. 1 to 7.

Figure 1:
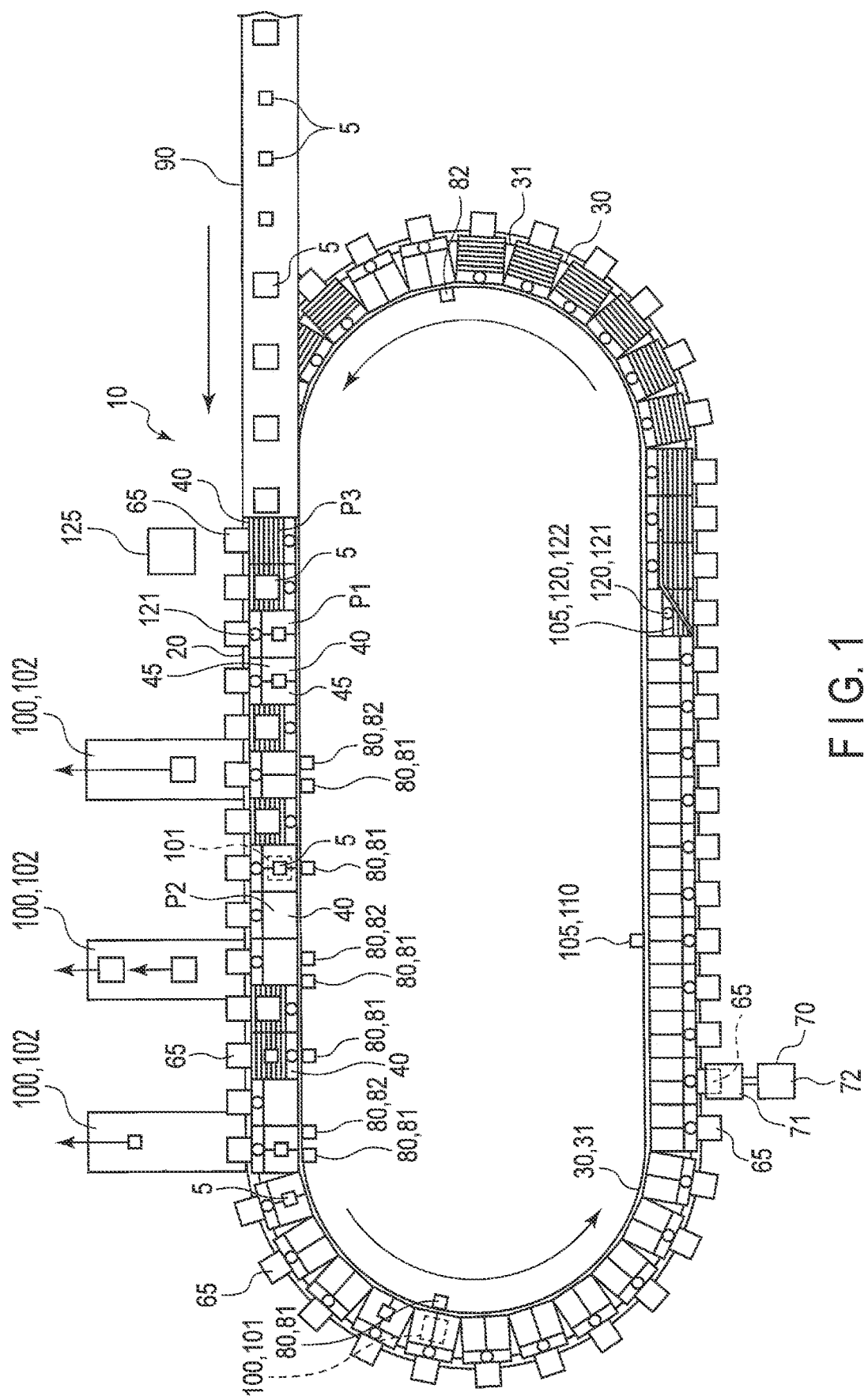
FIG. 1 is an explanatory view illustrating a configuration of a package sorting apparatus according to an embodiment.
Figure 3:
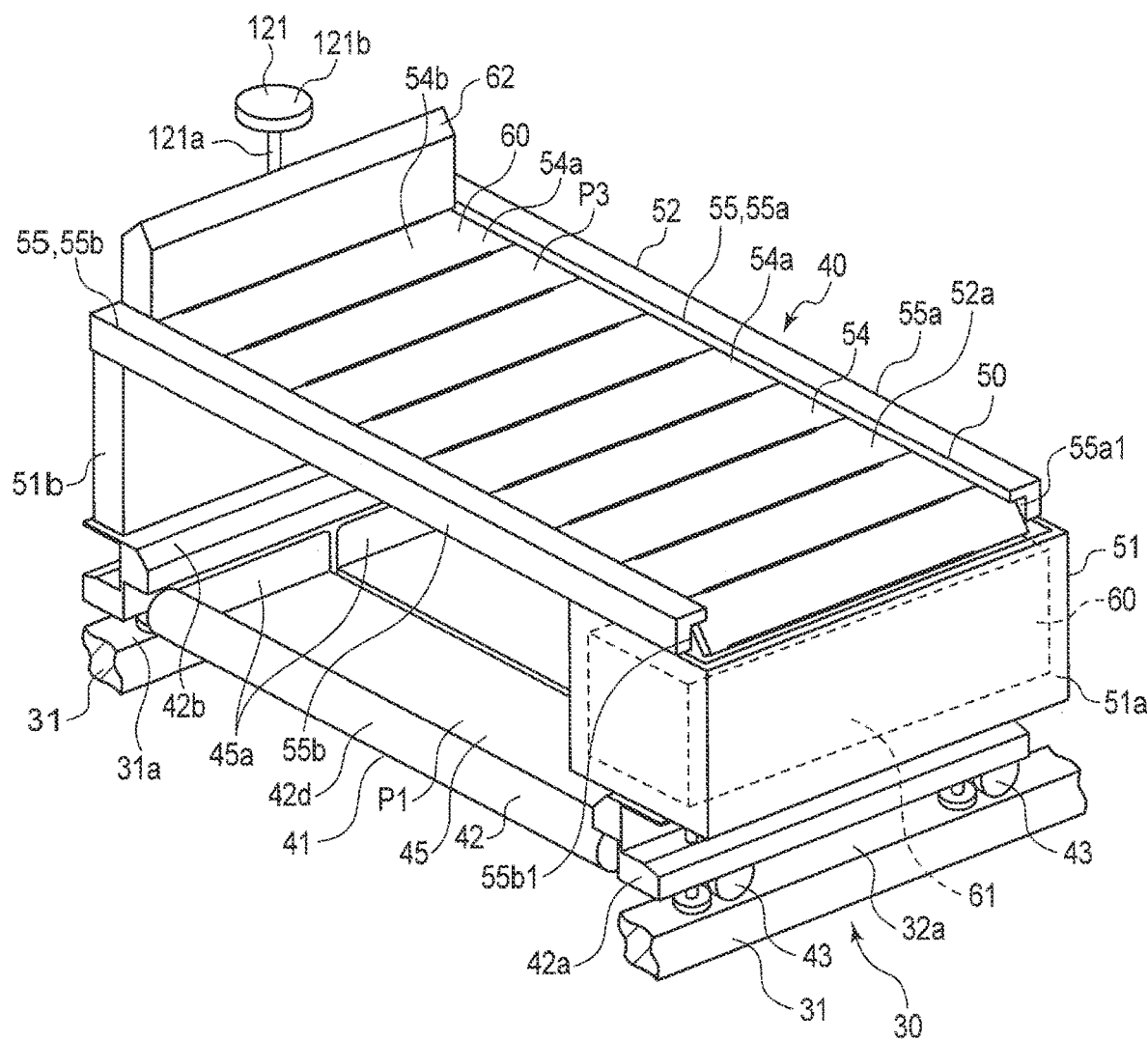
FIG. 3 is a perspective view illustrating a configuration of a conveyance apparatus used in the package sorting apparatus.
Figure 4:
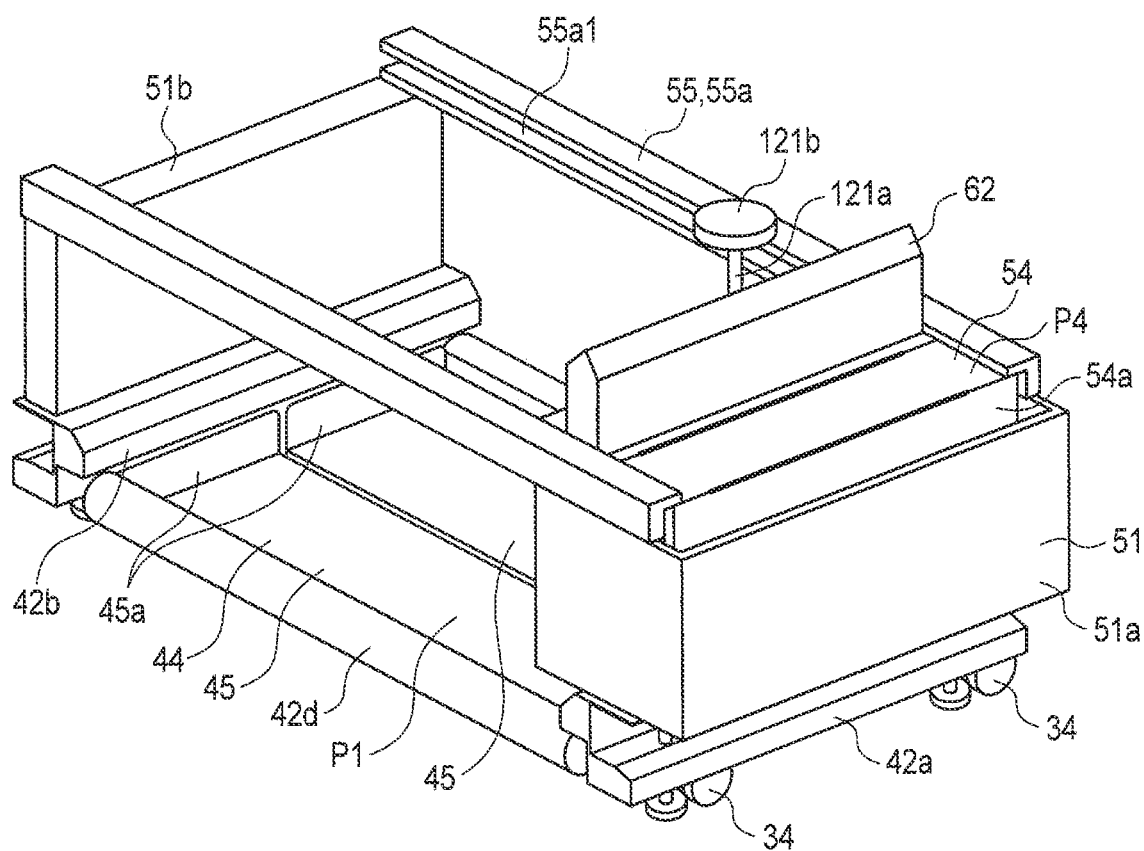
FIG. 4 is a perspective view illustrating a configuration of the conveyance apparatus.

FIG. 1 is an explanatory view illustrating a configuration of the package sorting apparatus 10. FIG. 2 is a cross-sectional view illustrating the configuration of the package sorting apparatus 10. FIG. 3 is a perspective view illustrating a configuration of a conveyance apparatus 40 used in the package sorting apparatus 10. FIG. 4 is a perspective view illustrating the configuration of the conveyance apparatus 40.

Figure 5:
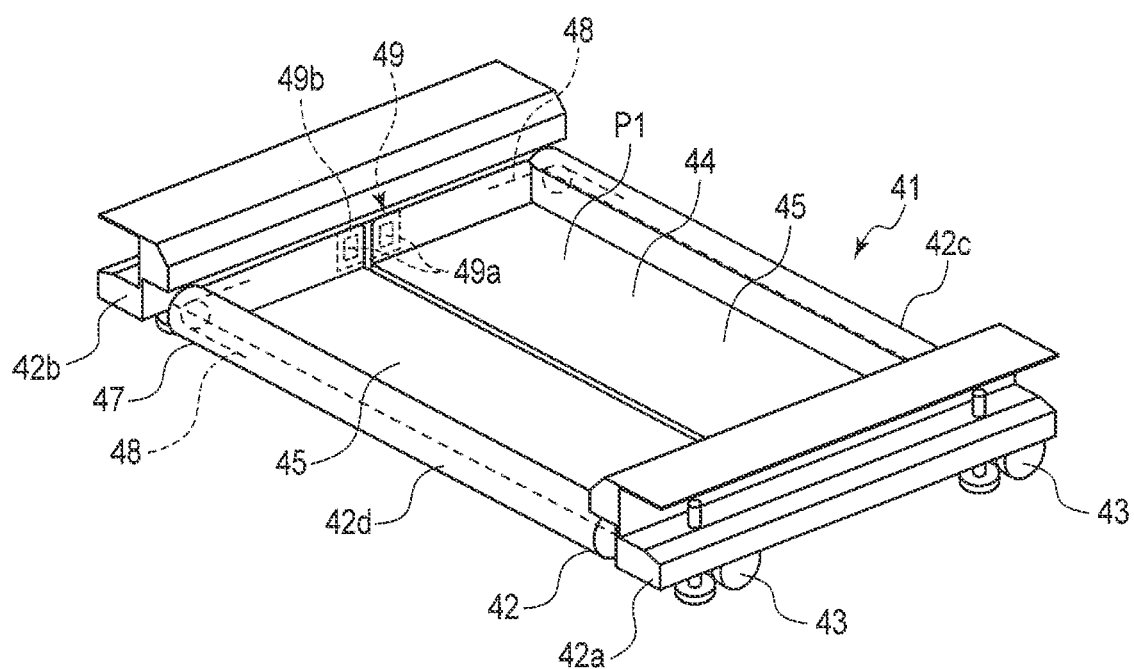
FIG. 5 is a perspective view illustrating a configuration of a conveyance apparatus main body of the conveyance apparatus.
Figure 7:
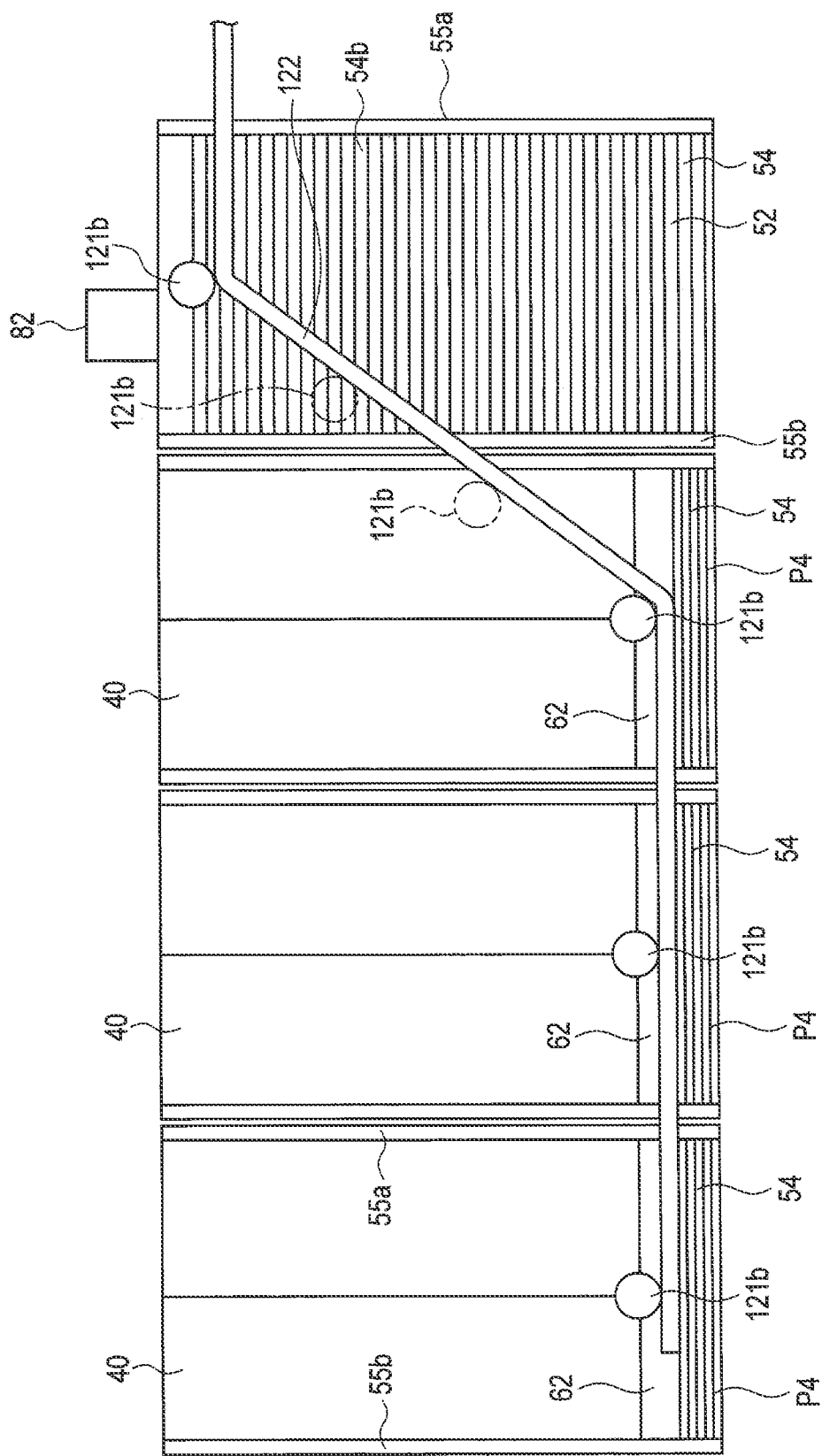
FIG. 7 is a plan view illustrating a configuration of a second returning device of the package sorting apparatus.

FIG. 5 is a perspective view illustrating a configuration of a conveyance apparatus main body 41 used in the conveyance apparatus 40. FIG. 6 is a cross-sectional view illustrating a configuration of an engaged portion 57, a second locking device 58, and a second releasing device 82 used in the conveyance apparatus 40. FIG. 7 is a plan view illustrating a configuration of a second returning device 120 used in the package sorting apparatus 10.

As illustrated in FIG. 1, the package sorting apparatus 10 includes a sorting apparatus main body 20, an induction 90, chutes 100, returning devices 105, and a control device 125. Packages 5 are fed into the sorting apparatus main body 20 by the induction 90, and are fed into the chutes 100 corresponding to their conveyance destinations by the sorting apparatus main body 20.

As illustrated in FIG. 1, the sorting apparatus main body 20 includes a rail 30, a plurality of conveyance apparatuses 40 provided on the rail 30, a driving device 70 that moves the plurality of conveyance apparatuses 40 along the rail 30, and operation devices 80 that cause the conveyance apparatuses 40 to perform an operation of feeding the packages 5 into the chutes 100.

The rail 30 is able to guide traveling of the plurality of conveyance apparatuses 40. The rail 30 includes, for example, a pair of rail members arranged in parallel to each other. As illustrated in FIGS. 1 and 2, the rail 30 is formed in, for example, an annular shape. The rail 30 includes a pair of rail members 31. One of the rail members 31 is disposed inside the other one of the rail members 31.

For example, the rail 30 is disposed at a predetermined height position with respect to a floor 6 of the installation place where the package sorting apparatus 10 is installed. The predetermined height position referred here is a height that allows first chutes 101, to be described below, of the chutes 100 to be disposed below the rail 30. The rail 30 is disposed at a height position that allows a worker to pass below the rail 30.

The plurality of conveyance apparatuses 40 is placed on the rail 30. Among the plurality of conveyance apparatuses 40, a pair of conveyance apparatuses 40 arranged adjacent to each other in the traveling direction abut on each other in the traveling direction.

As illustrated in FIGS. 2 to 5, the conveyance apparatuses 40 each include the conveyance apparatus main body 41 and a conveyance assisting apparatus 50 fixed to the conveyance apparatus main body 41.

As illustrated in FIG. 5, the conveyance apparatus main body 41 includes a first base portion 42, wheels 43 provided on the first base portion 42, and a first placement portion 44 which is provided on the first base portion 42 and on which at least one of the packages 5 can be placed. The conveyance apparatus main body 41 is a so-called bomb-bay tray in which the first placement portion 44 is configured to be openable, and when the first placement portion 44 is opened, the package 5 placed on the first placement portion 44 is fed into the corresponding chute 100.

The first base portion 42 is formed in, for example, a rectangular frame shape. The first base portion 42 includes, for example, a first member 42a, a second member 42b, a third member 42c, and a fourth member 42d, and is formed by coupling these first to fourth members 42a, 42b, 42c, and 42d in a rectangular frame shape.

The first member 42a is formed in a rod shape extending in one direction. The first member 42a is disposed on the outer rail member 31. The second member 42b is formed in a rod shape extending in one direction. The second member 42b is disposed on the inner rail member 31. The third member 42c is formed in a shape extending in one direction, and has one end coupled to the first member 42a, for example, in a rotatable manner, and the other end coupled to the second member 42b in a rotatable manner. The fourth member 42d is formed in a shape extending in one direction, and has one end coupled to the first member 42a in a rotatable manner and the other end fixed to the second member 42b. The first base portion 42 configured in this manner is movably supported by the rail 30. As an example, the first base portion 42 is movably supported with respect to the rail 30 via the wheels 43.

The wheels 43 are configured to enable the conveyance apparatus 40 to move along the rail 30. The plurality of wheels 43 is provided on, for example, lower surfaces of the first member 42a and the second member 42b. The wheels 43 provided on the first member 42a abut on the upper surface 31a of the outer rail member 31. The wheels 43 provided on the second member 42b abut on the upper surface 31a of the inner rail member 31.

The first placement portion 44 is an example of a door portion that allows the package 5 to be placed thereon when the first placement portion 44 is at a closed position, and drops the package 5 to the first chute 101, to be described below, of the chute 100 when the first placement portion 44 is opened. As illustrated in FIGS. 3 to 5, the first placement portion 44 includes, for example, a pair of plate members 45 rotatably supported by the first base portion 42, and switches a state of allowing the package 5 to be placed and a state of feeding the package 5 by opening and closing the pair of plate members 45. Specifically, the first placement portion 44 includes the pair of plate members 45 and an opening device 47 that opens the pair of plate members 45 from a closed state P1 to an opened state P2.

Each of the pair of plate members 45 is formed in, for example, a rectangular shape. The pair of plate members 45 is rotatably supported by the first base portion 42. In the present embodiment, each of the pair of plate members 45 is formed integrally with, for example, the third member 42c or the fourth member 42d. Since the third member 42c and the fourth member 42d are supported rotatably with respect to the first member 42a and the second member 42b, the pair of plate members 45 is supported rotatably with respect to the first base portion 42. In other words, the third member 42c and the fourth member 42d function as rotation shafts that support the pair of plate members 45 rotatably with respect to the first base portion 42.

At both ends of the pair of plate members 45 in the longitudinal direction, covering portions 45a that cover gaps between the plate members 45 and the first member 42a and between the plate members 45 and the second member 42b when the pair of plate members 45 is in the closed state P1 are formed. The covering portions 45a are formed in a wall shape rising up with respect to the main surfaces of the plate members 45.

The opening device 47 includes, for example, biasing members 48 that are configured to bias the pair of plate members 45 from the closed state P1 toward the opened state P2, and a first locking device 49 that fixes the two plate members 45 in the closed state P1.

The closed state P1 is a state in which the package 5 can be placed on the pair of plate members 45, and is a state in which the pair of plate members 45 covers the inside of the first base portion 42 formed in a frame shape. In the closed state P1, for example, the pair of plate members 45 is flush.

The opened state P2 is a state in which the pair of plate members 45 has rotated from the closed state P1 to be opened, and is a state in which the package 5 placed on the pair of plate members 45 can be fed into the first chute 101.

The biasing members 48 are, for example, helical springs that are configured to bias the third member 42c and the fourth member 42d serving as rotation shafts of the pair of plate members 45 to put the pair of plate members 45 in the opened state P2 from the closed state P1 with respect to the first member 42a and the second member 42b. The biasing members 48 are configured to bias the plate members 45 from the closed state P1 to the opened state P2, for example, by a configuration in which one end portions abut on the second member 42b and the other end portion abuts on the plate members 45.

The first locking device 49 includes, for example, an engaging portion 49a provided on each of the pair of plate members 45, and an engaged portion 49b provided on the first base portion 42 and engaged with the engaging portion 49a when the pair of plate members 45 is in the closed state P1.

Engagement of the engaging portions 49a of the pair of plate members 45 with the engaged portions 49b holds the pair of plate members 45 in the closed state P1. The engaged portions 49b are configured such that the engagement state with the engaging portion 49a can be released when operated from the outside.

As illustrated in FIGS. 3 and 4, the conveyance assisting apparatus 50 includes a second base portion 51 fixed to the first base portion 42 of the conveyance apparatus main body 41, a second placement portion 52 provided on the second base portion 51 and on which the package 5 can be placed, and a moving device 60 capable of moving the package 5 placed on the second placement portion 52 to feed the package 5 into a second chute 102, to be described below, of the chute 100.

The second base portion 51 positions the second placement portion 52 at a position of a predetermined height with respect to the first base portion 42. The predetermined height referred here is a height at which the package 5 placed on the first placement portion 44 does not interfere with the second placement portion 52. The second base portion 51 includes, for example, a first fixing member 51a fixed to the first member 42a and a second fixing member 51b fixed to the second member 42b.

The first fixing member 51a is formed in, for example, a box shape capable of housing a winding device 61, to be described below, of the moving device 60 and a placement member 54, to be described below, of the second placement portion 52. The first fixing member 51a is formed in, for example, a rectangular parallelepiped shape in which a part of the upper surface is open. The first fixing member 51a is fixed to the upper surface of the first member 42a in an orientation in which the longitudinal direction thereof is parallel to the first member 42a. The first fixing member 51a is fixed to the first member 42a by, for example, a fixing member. The fixing member is, for example, a screw.

The second fixing member 51b is formed in, for example, a plate shape elongated in one direction. The second fixing member 51b is fixed to the second member 42b in an orientation in which the longitudinal direction of the second fixing member 51b is along the longitudinal direction of the second member 42b. The second fixing member 51b is fixed to the second member 42b by, for example, a fixing member. The fixing member is, for example, a screw.

As illustrated in FIGS. 3, 4, and 6, the second placement portion 52 includes, for example, a placement member 54 configured to be movable, a second rail 55 that supports the placement member 54, and a second locking device 58 that fixes the placement member 54 in a state where the package 5 can be placed.

The placement member 54 is configured to be movable, for example, between a developed state P3 in which the placement member 54 is developed in a plate shape and a wound state P4 in which the placement member 54 is wound around one shaft. In other words, the placement member 54 is configured to be movable from a first position where the placement member 54 is in the developed state P3 to a second position where the placement member 54 is in the wound state P4. As the placement member 54, a bellows member is used as an example of a member movable between the developed state P3 and the wound state P4.

The placement member 54 has a size that covers the upper side of the first placement portion 44 when in the developed state P3. When the placement member 54 is in the wound state P4, the placement member 54 opens a space between a first rail member 55a and a second rail member 55b, which will be described below, of the second rail 55 so that the package 5 can be placed on the first placement portion 44 through the space between the first rail member 55a and the second rail member 55b.

The placement member 54 includes, for example, a plurality of rectangular plate members 54a elongated in one direction. The plurality of plate members 54a is formed from, for example, a metal material. The plurality of plate members 54a is arranged along one direction in an orientation in which edges, along the longitudinal direction, of a pair of adjacent ones of the plate members 54a face each other. The pair of adjacent plate members 54a is coupled to each other so that the adjacent plate members 54a are rotatable about the edges along the longitudinal direction.

As illustrated in FIG. 6, the placement member 54 is provided with an engaged portion 57 configured to be engageable with the second locking device 58. For example, the engaged portion 57 is provided at one end of the placement member 54 on the second fixing member 51b side in the longitudinal direction. The engaged portion 57 is configured, for example, by fixing an engaged member 57a having a U-shape in a plane to one end of the placement member 54 in the longitudinal direction. In the engaged member 57a, for example, both ends 57a1 of the engaged member 57a are fixed to the placement member 54 via a fixing member 57b.

The second rail 55 is configured to support the placement member 54 in the developed state P3 in an orientation in which the package 5 can be placed on an upper surface 54b of the placement member 54. The second rail 55 supports the placement member 54 in the developed state P3 in an orientation covering the first placement portion 44. In addition, the second rail 55 is able to support the movement of the placement member 54 between the developed state P3 and the wound state P4.

For example, the second rail 55 supports the edge portions, along the lateral direction, of each of the plurality of plate members 54a so that the plate members 54a are movable between the developed state P3 in which the placement member 54 is developed and a wound state P4 in which the placement member 54 is wound. The second rail 55 includes, for example, the first rail member 55a and the second rail member 55b.

The first rail member 55a is able to support one edge portions, along the lateral direction, of the plurality of plate members 54a. The first rail member 55a is formed in a shape extending in one direction. One end portion of the first rail member 55a is fixed to an upper portion of the first fixing member 51a. The other end portion of the first rail member 55a is fixed to an upper portion of the second fixing member 51b. In the first rail member 55a, a groove 55a1 for accommodating one edge portions, along the lateral direction, of the plurality of plate members 54a is formed.

The second rail member 55b is able to support the other edge portions, along the lateral direction, of the plurality of plate members 54a. The second rail member 55b is formed in a shape extending in one direction. One end portion of the second rail member 55b is fixed to an upper portion of the first fixing member 51a. The other end portion of the second rail member 55b is fixed to an upper portion of the second fixing member 51b. In the second rail member 55b, a groove 55b1 for accommodating the other edge portions, along the lateral direction, of the plurality of plate members 54a is formed.

In the second placement portion 52 configured as described above, the placement member 54 moves in the first direction when moving from the developed state P3 (first position) to the wound state P4 (second position). Here, in the present embodiment, since the placement member 54 is supported by the second rail 55, the first direction is parallel to the upper surface 54b.

The second placement portion 52 configured as described above is configured such that, for example, the maximum loading capacity of the second placement portion 52 is larger than the maximum loading capacity of the first placement portion 44. The placement member 54 of the second placement portion 52 configured as described above moves from the developed state P3 (first position) to the wound state P4 (second position), thereby feeding the package 5 into the second chute 102.

As illustrated in FIG. 6, the second locking device 58 is configured to be capable of fixing the placement member 54 in the developed state P3 by engaging with the placement member 54 in the developed state P3. In addition, the second locking device 58 is able to release the fixation of the placement member 54 when a predetermined operation is performed from the outside. The second locking device 58 is configured to be engageable with the placement member 54, for example, via the engaged portion 57 provided on the placement member 54.

The second locking device 58 includes, for example, a case 58a fixed to the second fixing member 51b of the second base portion 51, an engaging member 58b accommodated in the case 58a and to which the engaged portion 57 is engaged, an operation portion 58c to which an operation is input from the outside, and a coupling mechanism 58d that couples the operation portion 58c and the engaging member 58b.

The case 58a is disposed at a position facing the engaged portion 57 in the moving direction of the engaged portion 57 along with the movement of the placement member 54 from the wound state P4 to the developed state P3. In the case 58a, an opening 58a1 is formed at a position facing the engaged portion 57 of the engaged portion 57 in the moving direction. The distal end portion of the engaged portion 57 is inserted into the opening 58a1 along with the movement of the engaged portion 57 when the placement member 54 moves from the wound state P4 to the developed state P3.

The engaging member 58b is configured to be capable of engaging the engaged portion 57 therewith and releasing the engagement with the engaged portion 57 when the operation portion 58c is operated. The engaging member 58b is formed, for example, in a plate shape and is rotatably supported by a first rotation shaft 58a2 in the case 58a. A recessed portion 58b1 that accommodates the distal end portion of the engaged portion 57 in the projecting direction from the placement member 54 is formed at an edge portion of the engaging member 58b.

The engaging member 58b configured as described above is supported in the case 58a such that the recessed portion 58b1 is rotatable between a release position P5 and an engagement position P6. The release position P5 is a position where the recessed portion 58b1 faces the distal end of the engaged portion 57 along the moving direction of the engaged portion 57 when the placement member 54 moves from the wound state P4 to the developed state P3. The engagement position P6 is a position of the recessed portion 58b1 after rotation from the release position P5 and a position where the distal end portion of the engaged portion 57 is engaged with the concave portion 58b1. In FIG. 6, the engaging member 58b at the release position P5 is indicated by a two-dot chain line, and the engaging member 58b at the engagement position P6 is indicated by a solid line.

The engaging member 58b is biased from the release position P5 toward the engagement position P6. For example, the second locking device 58 includes a spring 58e that is provided around the first rotation shaft 58a2 and biases the engaging member 58b from the release position P5 to the engagement position P6.

The operation portion 58c is provided, for example, on the side of the case 58a opposite to the opening 58a1. The operation portion 58c is formed in, for example, a shape elongated in one direction. A part of the operation portion 58c is accommodated in the case 58a. The operation portion 58c is rotatably supported in the case 58a by a second rotation shaft 58a3. The operation portion 58c is operated to rotate about the second rotation shaft 58a3. The second rotation shaft 58a3 is formed to be parallel to the first rotation shaft 58a2.

The coupling mechanism 58d is able to rotate the engaging member 58b from the engagement position P6 to the release position P5 by transmitting the rotation of the operation portion 58c to the engaging member 58b. The coupling mechanism 58d is coupled to, for example, a portion of the operation portion 58c on the engaging member 58b side with respect to the second rotation shaft 58a3, and coupled to the engaging member 58b.

More specifically, the coupling mechanism 58d includes, for example, a coupling member 58d1 having a shape elongated in one direction, a third rotation shaft 58d2, and a fourth rotation shaft 58d3. One end portion of the coupling member 58d1 is rotatably coupled to a portion of the operation portion 58c on the engaging member 58b side with respect to the second rotation shaft 58a3 by the third rotation shaft 58d2. The third rotation shaft 58d2 is formed to be parallel to the first rotation shaft 58a2. The other end portion of the coupling member 58d1 is rotatably coupled to the engaging member 58b by the fourth rotation shaft 58d3. The fourth rotation shaft 58d3 is formed to be parallel to the first rotation shaft 58a2.

As illustrated in FIGS. 3 and 4, the moving device 60 is configured to move the packages 5 placed on an upper surface 52a of the second placement portion 52, that is, the upper surface 54b of the placement member 54 in the developed state P3 so that the package can be fed into the second chute 102.

The moving device 60 is, for example, a winding device that moves the placement member 54 from the developed state P3 to the wound state P4.

The moving device 60 is provided in the first fixing member 51a. For example, to the moving device 60, one end of the placement member 54 is fixed. The moving device 60 biases the placement member 54 to move it from the developed state P3 to the wound state P4. The moving device 60 is, for example, a spring.

The moving device 60 is able to adjust a winding speed of the placement member 54, for example. In a case where the moving device 60 includes, for example, a spring, the winding speed of the placement member 54 can be adjusted by replacing the spring.

In addition, on the upper surface 54b serving as the placement surface of the placement member 54, a projecting portion 62 is provided. The projecting portion 62 projects from the upper surface 54b. Further, the projecting portion 62 is formed in a shape extending along a second direction intersecting with the first direction, which is a moving direction of the placement member 54 when the placement member 54 moves from the developed state P3 (first position) to the wound state P4 (second position).

The projecting portion 62 is able to abut on one of the packages 5 that is placed on the upper surface 54b of the placement member 54 when the package 5 moves on the upper surface 54b while the placement member 54 moves from the developed state P3 to the wound state P4.

Here, movement of the package 5 on the upper surface 54b of the placement member 54 means, for example, that the placement member 54 slides with respect to the package 5 when the placement member 54 moves from the developed state P3 to the wound state P4 while the package 5 placed on the upper surface 54b of the placement member 54 in the developed state P3 is about to stay there by its own weight.

The projecting portion 62 is provided at one end of the placement member 54 on the second fixing member 51b side. The projecting portion 62 is formed in a shape projecting upward from the placement member 54. Further, the projecting portion 62 is formed in a shape extending from the vicinity of one end to the vicinity of the other end of the placement member 54 in the lateral direction. Here, the lateral direction of the placement member 54 is a direction parallel to the rotation shaft when the placement member 54 moves to the wound state P4, and is the width direction of the second rail 55. The projecting portion 62 is formed in, for example, a plate shape. The lateral direction of the placement member 54 is an example of the second direction intersecting the first direction that is the moving direction of the placement member 54.

In addition, the conveyance apparatus 40 includes application portions 65 to which a driving force for traveling on the rail 30 is applied from the driving device 70. As illustrated in FIG. 1, for example, the application portions 65 are provided at an end portion of the conveyance apparatus 40 on the outer peripheral side of the rail 30. The application portions 65 are provided, for example, on the second member 42b that is an end portion of the first base portion 42 on the outer rail member 31 side. The application portions 65 are formed in a shape projecting from the second members 42b.

For example, the driving device 70 is configured to move the plurality of conveyance apparatuses 40 along the rail 30 by biasing the application portions 65 forward in the traveling direction of the conveyance apparatus 40. The driving device 70 is provided outside the outer rail member 31 of the rail 30 and the number of the driving device 70 is, for example, one. The driving device 70 includes, for example, a pair of rollers 71 and a driving portion 72 that rotates the pair of rollers.

The pair of rollers 71 is provided to be separated from each other in the vertical direction. In addition, the pair of rollers 71 is provided so that the application portion 65 can be sandwiched between the pair of rollers 71. The rotation shafts of the pair of rollers 71 are parallel to a direction orthogonal to the traveling direction of the conveyance apparatus 40.

The driving portion 72 is configured to rotate at least one of the pair of rollers 71, for example, both rollers 71 in a direction in which the application portion 65 is pushed out from a position between the pair of rollers 71. The driving portion 72 includes, for example, a motor.

In the present embodiment, each of the operation devices 80 is able to release the fixation of the pair of plate members 45 by the first locking device 49 of the conveyance apparatus main body 41 and release the fixation of the placement member 54 by the second locking device 58 of the conveyance assisting apparatus 50. The operation device 80 includes, for example, a first releasing device 81 that releases the fixation by the first locking device 49 and the second releasing device 82 that releases the fixation by the second locking device 58.

The first releasing device (first device) 81 is provided, for example, in the vicinity of the first chute 101 of the rail 30, and configured to operate the conveyance apparatus 40 that has moved to the first chute 101. The first releasing device 81 operates the engaged portions 49b of the first locking device 49 to release the engagement between the engaged portions 49b and the engaging portions 49a of the pair of plate members 45.

As illustrated in FIG. 1, the first releasing devices 81 are disposed at positions where the packages 5 can be fed into the first chutes 101 of the chutes 100. Here, the position where the package 5 can be fed into each of the first chutes 101 is a position where the package 5 that falls into the first chute 101 when the engagement of the engaged portions 49b and the engaging portions 49a of the pair of plate members 45 is released to open the pair of plate members 45. The first releasing devices 81 are provided inside the inner rail member 31 of the rail 30, and the number of the first releasing devices 81 is, for example, a number corresponding to the first chutes 101.

Each of the second releasing devices (second devices) 82 is provided, for example, in the vicinity of the corresponding second chute 102 of the rail 30, and is configured to operate the conveyance apparatus 40 that has moved to the second chute 102. As illustrated in FIG. 6, the second releasing device 82 is able to operate the operation portion 58c of the second locking device 58. The second releasing device 82 includes, for example, an abutting portion 82a that abuts on the operation portion 58c from below, and a driving portion 82b that moves the abutting portion 82a in the vertical direction.

The driving portion 82b causes the abutting portion 82a to abut on the operation portion 58c of the conveyance apparatus 40 in the developed state P3 of the placement member 54 from below. Then, the driving portion 82b rotates the engaging member 58b of the second locking device 58 to the release position P5 by moving the abutting portion 82a upward.

As illustrated in FIG. 1, the second releasing devices 82 are disposed at positions where the packages 5 can be fed into the second chutes 102 of the chutes 100. Here, the position where the package 5 can be fed into each of the second chutes 102 is a position where the package 5 is moved to be fed into the second chute 102 as the placement member 54 moves from the developed state P3 to the wound state P4. The second releasing devices 82 are provided inside the inner rail member 31 of the rail 30, and the number of the second releasing devices 82 is, for example, a number corresponding to the second chutes 102.

The second releasing devices 82 configured as described above are also used as parts of the second returning device 120 to be described below of each of the returning devices 105. In addition, one second releasing device 82 is provided on the secondary side of the guide rail 122 of the second returning device 120.

The induction 90 is able to convey the packages 5 to the rail 30. The induction 90 is, for example, a belt conveyor or a roller conveyor. The induction 90 places the packages 5 fed by, for example, a worker on the plurality of conveyance apparatuses 40 on the rail 30.

The plurality of chutes 100 is provided according to conveyance destinations of the packages 5. The chutes 100 include a plurality of first chutes 101 disposed below the rail 30 and a plurality of second chutes 102 disposed inside the rail 30 or outside the rail 30.

As illustrated in FIG. 2, each of the first chutes 101 is, for example, a container disposed below the rail 30. The package 5 placed on the first placement portion 44 of the conveyance apparatus main body 41 is fed into the first chute 101.

The second chutes 102 are provided, for example, outside the rail 30. The second chutes 102 each comprises, for example, a bottom wall 104 extending in one direction to form an inclined surface 103. The inclined surface 103 is formed in a surface on which the packages 5 can be fed from the second placement portions 52 of the plurality of conveyance apparatuses 40 disposed on the rail 30.

The height position of one end of the inclined surface 103 on the rail 30 side is set to a height position enabling feeding of the packages 5 from the second placement portions 52. The height position of one end of the inclined surface 103 on the rail 30 side is set to, for example, a height position slightly lower than the upper surfaces 52a of the second placement portions 52.

The returning devices 105 each is configured to return the pair of plate members 45 from the opened state P2 to the closed state P1, and return the placement member 54 in the wound state P2 to the developed state P3. The returning device 105 includes, for example, a first returning device 110 that returns the pair of plate members 45 in the opened state P2 to the closed state P1, and a second returning device 120 that returns the placement member 54 in the wound state P2 to the developed state P3.

The first returning device 110 is provided between the first chute 101 and the induction 90 disposed at the last part of the conveyance apparatus 40 in the traveling direction. The first returning device 110 is able to move the pair of plate members 45 in the opened state P2 to the closed state P1 along with the traveling of the conveyance apparatus 40.

As illustrated in FIGS. 1 and 3, the second returning device 120 includes, for example, a guided portion 121 provided to be movable integrally with the placement member 54, and a guide rail 122 that abuts on the guided portion 121 as the conveyance apparatus 40 travels and guides the guided portion 121 to a position where the engaged portion 57 is engaged with the engaging member 58b of the second locking device 58.

As illustrated in FIGS. 3 and 4, the guided portion 121 includes, for example, a fifth rotation shaft 121a provided on the projecting portion 62 and a roller 121b provided rotatably on the fifth rotation shaft 121a.

The fifth rotation shaft 121a is fixed, for example, to the projecting portion 62 at the center, in the width direction, of a surface that is the rear surface, in the moving direction, of the projecting portion 62 when the placement member 54 moves from the developed state P3 to the wound state P4. The fifth rotation shaft 121a is formed to be parallel to the vertical direction. The roller 121b is rotatably supported by the upper end portion of the fifth rotation shaft 121a.

As illustrated in FIGS. 1 and 7, the guide rail 122 is provided between the second chute 102 and the induction 90 disposed at the last part of the conveyance apparatus 40 in the traveling direction. The guide rail 122 is disposed on the front side, in the moving direction of the roller 121b when the placement member 54 moves from the developed state P3 to the wound state P4, with respect to the roller 121b when the placement member 54 is in the wound state P4, and at a position where the guide rail 122 abuts on the roller 121b. The guide rail 122 is formed in a shape extending in a direction intersecting the rail 30.

The second releasing device 82 used in the second returning device 120 is provided at a position where the second releasing device 82 moves the engaging member 58b to the release position P5 before the engaged portion 57 is moved, by the guided portion 121 and the guide rail 122, to a position where the engaged portion 57 can be engaged with the engaging member 58b.

The control device 125 is able to control the driving device 70, the plurality of first releasing devices 81, and the plurality of second releasing devices 82. Specifically, in order to feed the package 5 placed on the conveyance apparatus 40 into one of the first chutes 101 or the second chutes 102, the control device 125 drives one of the first releasing devices 81 or the second releasing devices 82 at a timing when the package 5 is fed into the first chute 101 or the second chute 102.

For example, the control device 125 controls the plurality of first releasing devices 81 and the plurality of second releasing devices 82 according to the condition of the package 5 based on a program stored in advance. The condition of the package 5 is, for example, the weight of the package 5. The control device 125 includes, for example, an operation portion for inputting a condition of the package 5. The operation portion is operated by a worker.

The control device 125 may include, for example, a processor and a storage medium. The processor may include, for example, one or more integrated circuits.

Next, an example of sorting work of the packages 5 by the package sorting apparatus 10 will be described. First, the driving device 70 is driven by the control device 125. When the driving device 70 is driven, the pair of rollers 71 is rotated. The rotation of the pair of rollers 71 pushes out the application portions 65 sandwiched between the pair of rollers 71 forward in the traveling direction of the conveyance apparatus 40. Since the application portion 65 is pushed out, the conveyance apparatus 40 is pushed out forward in the traveling direction and starts traveling.

In addition, for example, a worker inputs a sorting condition for sorting each package 5 into one of the chutes 100 based on the conveyance destination to the control device 125. Alternatively, the induction 90 may be provided with a detection device that detects a condition for sorting the package 5, and the control device 125 may detect the condition for sorting the package 5 using the detection device.

In the present embodiment, the sorting condition includes the weight of the package 5. The package 5 is placed on the first placement portion 44 or the second placement portion 52 depending on its weight. Specifically, in a case where its weight is equal to or less than the maximum loading capacity of the first placement portion 44, the package 5 is placed on the first placement portion 44. In a case where the weight is larger than the maximum loading capacity of the first placement portion 44, the package 5 is placed on the second placement portion 52.

The control device 125 drives the second releasing device 82 provided between the guide rail 122 of the second returning device 120 and the induction 90 based on the sorting condition of the package 5. That is, for the package 5 to be fed into the first chute 101, the control device 125 drives the second releasing device 82 provided between the guide rail 122 and the induction 90 to move the placement member 54 in the developed state P3 to the wound state P4 in order to place the package 5 on the first placement portion 44.

When the second releasing device 82 is driven, the driving portion 82b moves the abutting portion 82a upward. When the abutting portion 82a is moved upward, the abutting portion abuts, from below, on one end portion of the operation portion 58c projecting from the case 58a to move the one end portion upward.

When the one end portion is moved upward, the operation portion 58c rotates about the second rotation shaft 58a3. The operation portion 58c rotates about the second rotation shaft 58a3 to rotate the engaging member 58b from the engagement position P6 to the release position P5 against the biasing force of the spring 58d via the coupling mechanism 58d.

When the engaging member 58b is moved to the release position P5, the engaged portion 57 is moved in a direction away from the recessed portion 58b1 of the engaging member 58b by the tensile force of the winding device 61 acting on the placement member 54. When the engaged portion 57 is separated from the recessed portion 58b1, the engagement between the engaged portion 57 and the engaging member 58b is released.

When the engagement of the engaged portion 57 and the engaging member 58b is released, the placement member 54 moves from the developed state P3 to the wound state P4 by the tensile force of the winding device 61. The movement of the placement member 54 from the developed state P3 to the wound state P4 is guided by the second rail 55.

As described above, before reaching the induction 90, the plurality of conveyance apparatuses 40 is brought into the developed state P3 or the wound state P4 of the placement member 54 of the second placement portion 52 according to the packages 5 placed thereon.

Each of the packages 5 fed from the induction 90 is placed on the first placement portion 44 or the second placement portion 52 of the corresponding conveyance apparatus 40.

For the conveyance apparatus 40 having the package 5 placed on the first placement portion 44, the control device 125 drives the first releasing device 81 at the timing of feeding the package 5 into the first chute 101.

When receiving a drive signal from the control device 125, the first releasing device 81 operates the engaged portions 49b of the first locking device 49. The engaged portions 49b are operated from the first releasing device 81 to release the engagement with the engaging portions 49a of the pair of plate members 45. When the engagement between the engaging portions 49a of the pair of plate members 45 and the engaged portions 49b is released, the pair of plate members 45 is displaced from the closed state P1 to the opened state P2 by the biasing force of the biasing members 48. When the pair of plate members 45 is in the opened state P2, the package 5 placed on the first placement portion 44 falls due to gravity and is fed into the first chute 101.

For the conveyance apparatus 40 having the package 5 placed on the second placement portion 52, the control device 125 drives the second releasing device 82 at the timing of feeding the package 5 into the second chute 102.

When receiving a drive signal from the control device 125, the second releasing device 82 drives the driving portion 82b to release the engagement between the engaged portion 57 and the second locking device 58. When the engagement between the engaged portion 57 and the second locking device 58 is released, the placement member 54 is wound by the winding device 61 to move to the wound state P4.

When the placement member 54 moves from the developed state P3 to the moved state P4, the package 5 placed on the placement member 54 moves together with the placement member 54. Alternatively, the package 5 placed on the placement member 54 is moved by being pushed by the projecting portion 62 when the placement member 54 moves from the developed state P3 to the wound state P4. As described above, the package 5 placed on the placement member 54 is moved along with the movement of the placement member 54, thereby being moved to the outside of the second placement portion 52 and fed into the second chute 102.

When the conveyance apparatus 40 reaches the first returning device 110, the control device 125 drives the first returning device 110. When receiving a drive signal from the control device 125, the first returning device 110 closes the pair of plate members 45 in the opened state P2 to bring the pair of plate members 45 into the closed state P1. When the pair of plate members 45 is brought into the closed state P1, the engaging portions 49a are engaged with the engaged portions 49b, whereby the pair of plate members 45 is fixed in the closed state P1.

When the conveyance apparatus 40 reaches the guide rail 122 of the second returning device 120, the roller 121b of the guided portion 121 abuts on the guide rail 122. As illustrated in FIG. 7, when the roller 121b abuts on the guide rail 122, the roller 121b moves along the guide rail 122 as the conveyance apparatus 40 travels.

As the roller 121b moves along the guide rail 122, the placement member 54 moves from the wound state P4 to the developed state P3. When the placement member 54 moves from the wound state P4 to the developed state P3, the engaged portion 57 moves toward the second locking device 58.

The control device 125 also drives the driving portion 82b of the second releasing device 82. When the driving portion 82b is driven, the engaging member 58b is rotated from the engagement position P6 to the release position P5 before the engaged portion 57 reaches the position where it can be engaged with the engaging member 58b. Then, at the timing when the conveyance apparatus 40 passes through the guide rail 122, the distal end portion of the engaged portion 57 enters the case 58a through the opening 58a1 of the case 58a of the second locking device 58 and is fitted into the recessed portion 58b1 of the engaging member 58b at the release position P5.

Then, at the timing when the engaged portion 57 is engaged with the engaging member 58b or immediately thereafter, the conveyance apparatus 40 passes through the second releasing device 82, so that the operation on the operation portion 58c is released, and the engaging member 58b returns to the engagement position P6. When the engaging member 58b returns to the engagement position P6, the state in which the engaged portion 57 is engaged with the engaging member 58b is locked.

Alternatively, the control device 125 may return the engaging member 58b to the engagement position P6 by driving the driving portion 82b to lower the abutting portion 82a at the timing when the engaged portion 57 is accommodated in the recessed portion 58b1 of the engaging member 58b.

As described above, according to the package sorting apparatus 10, the second releasing device 82 switches the state of the placement member 54 of the second placement portion 52 between the developed state P3 and the wound state P4 on the primary side of the induction 90 according to the sorting condition of the package 5 placed on the conveyance apparatus 40, so that the package 5 can be placed on the first placement portion 44 or the second placement portion 52 by the induction 90. Then, the package 5 can be fed into the first chute 101 or the second chute 102.

Since the conveyance apparatus 40 includes the conveyance assisting apparatus 50, the second chutes 102 can be disposed on the side of the rail 30. This improves the degree of freedom in the arrangement of the second chutes 102.

The conveyance apparatus 40 is configured such that one of the packages 5 can be placed on each of the first placement portion 44 of the conveyance apparatus main body 41 and the second placement portion 52 of the conveyance assisting apparatus 50. Therefore, the conveyance apparatus 40 can convey the packages 5 having different sorting conditions, so that the efficiency of sorting the packages 5 can be improved.

Furthermore, by placing one of the packages 5 that is lighter on the first placement portion 44 of the conveyance apparatus main body 41 and placing one of the packages 5 that is heavier on the second placement portion 52 of the conveyance assisting apparatus 50, it is possible to prevent the previously fed package 5 from being damaged by the subsequently fed package 5 in the first chute 101.

Furthermore, since the placement member 54 is provided with the projecting portion 62, even if the package 5 slides on the upper surface 54b of the placement member 54 when the placement member 54 moves from the developed state P3 to the wound state P4, the projecting portion 62 abuts on the package 5. As a result, the package 5 is moved by the projecting portion 62 and the placement member 54 and fed into the second chute 102. In this manner, even if the package 5 slides with respect to the placement member 54, the package 5 can be fed into the second chute 102 by the projecting portion 62. In addition, since the package 5 is moved by the projecting portion 62, it is possible to prevent the package 5 from falling from the second placement portion 52 to the first placement portion 44.

Furthermore, the conveyance apparatus 40 can be configured by fixing the second base portion 51 to the first base portion 42 of the conveyance apparatus main body 41. Therefore, the conveyance apparatus main body 41 can be used alone. In other words, the conveyance apparatus 40 can be configured by fixing the conveyance assisting apparatus 50 to the conveyance apparatus main body 41 that has been used alone.

Furthermore, the time length from the start to the completion of feeding the package 5 into the second chute 102 by the conveyance apparatus 40 can be adjusted by the winding device 61 of the moving device 60. Therefore, by adjusting the speed of winding by the winding device 61, the efficiency of sorting the packages 5 can be improved.

Furthermore, since the package sorting apparatus 10 is configured by disposing the first chutes 101 below the rail 30, the rail 30 is disposed at a high place with respect to the floor 6. Therefore, a worker can pass below the rail 30 through regions other than the first chutes 101.

Furthermore, since the package sorting apparatus 10 is configured by disposing the second chutes 102 on the side of the rail 30, the degree of freedom in installation of the second chutes 102 is high. Therefore, the degree of freedom of installation of the package sorting apparatus 10 can be improved.

Furthermore, since the second returning device 120 that returns the placement member 54 from the wound state P4 to the developed state P3 includes the guided portion 121 that moves integrally with the placement member 54 and the guide rail 122 that guides the movement of the guided portion 121, it is possible to return the placement member 54 to the developed state P3 as the conveyance apparatus 40 travels. Therefore, a complicated configuration is not required as a configuration for returning the placement member 54 from the wound state P4 to the developed state P3, so that the second returning device 120 can have a simple configuration.

As described above, according to the package sorting apparatus 10 according to the present embodiment, the conveyance apparatuses 40 each includes the conveyance assisting apparatus 50, so that the second chutes 102 can be arranged on the side of the rail 30, and thus the degree of freedom in the arrangement of the second chutes 102 can be improved.

In the above example, the configuration in which one of the first placement portion 44 or the second placement portion 52 is selected as the placement position of each of the packages 5 based on the weight of the package 5 has been described as an example. Then, the configuration in which the package 5 fed into the first chute 101 can be prevented from being damaged due to the smaller weight of the package 5 fed into the first chute 101 than the weight of the package 5 fed into the second chute 102 has been described. However, the condition for selecting the first placement portion 44 or the second placement portion 52 as the placement position of the package 5 is not limited to the weight of the package 5. In another example, the control device 125 may select the placement position of the package 5 based on at least one of the size, shape, or type of the package 5.

In the above example, the configuration of the conveyance apparatus 40 including the conveyance apparatus main body 41 and the conveyance assisting apparatus 50 has been described as an example, but the present invention is not limited thereto. For example, the conveyance apparatus 40 may not include the conveyance apparatus main body 41, and may include the conveyance assisting apparatus 50 and the wheels 43 that support the conveyance assisting apparatus 50 so that the conveyance assisting apparatus 50 is able to travel with respect to the rail 30.

That is, the conveyance apparatus 40 may not include the conveyance apparatus main body 41, and may include the second base portion 51, the second placement portion 52 which is provided on the second base portion 51 and on which the package 5 can be placed, and the moving device 60 which can move the package 5 placed on the second placement portion 52 to feed it into the second chute 102.

Figure 8:
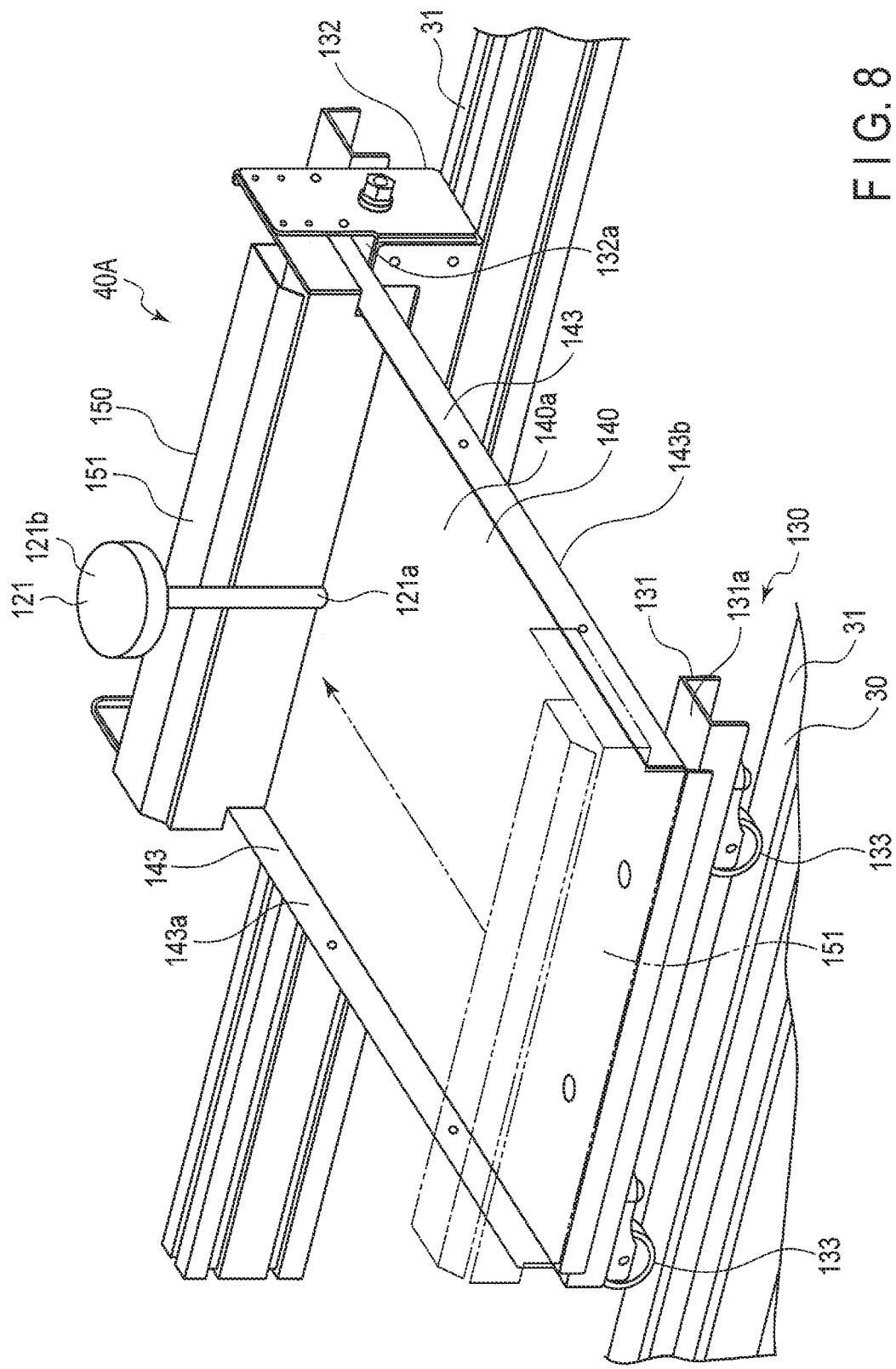
FIG. 8 is a perspective view illustrating a configuration of a modification of the conveyance apparatus.

An example of this modification will be described with reference to FIGS. 8 and 9. FIG. 8 is a perspective view illustrating a configuration of a conveyance apparatus 40A. FIG. 9 is a side view illustrating the configuration of the conveyance apparatus 40A.

As illustrated in FIGS. 8 and 9, the conveyance apparatus 40A includes a base portion 130, a placement portion 140 which is provided on the base portion 130 and on which the package 5 can be placed, a moving device 150 which moves the package 5 placed on the placement portion 140 along the placement portion 140 to feed the package 5 into the second sorting chute 102 of the placement portion 140, and a locking device 160.

The base portion 130 includes, for example, a fifth member 131, a sixth member 132, and wheels 133.

The fifth member 131 is formed in a shape elongated in one direction. The fifth member 131 is disposed above the inner rail member 31 of the rail 30. The fifth member 131 is formed in, for example, a box shape for accommodating a winding device 152b, to be described below, of a moving device 150.

The sixth member 132 is formed in a shape elongated in one direction. The sixth member 132 is disposed on the outer rail member 31 of the rail 30. The sixth member 132 is provided, for example, in parallel with the fifth member 131.

For example, a plurality of the wheels 133 is provided on a lower surface 131a of the fifth member 131, and a plurality of the wheels 133 is provided on the lower surface 132a of the sixth member 132. The wheels 133 are configured to enable the conveyance apparatus 40A to travel along the rail 30.

The placement portion 140 is formed in, for example, a rectangular plate shape elongated in one direction. The placement portion 140 is fixed to an upper surface 131b of the fifth member 131 and the upper surface 132b of the sixth member 132 by, for example, a fixing member. The fixing member is, for example, a screw. Specifically, one end portion of the placement portion 140 in the longitudinal direction is fixed to the fifth member 131, and the other end portion of the placement portion 140 in the longitudinal direction is fixed to the sixth member 132.

A guiding portion 143 is provided at an edge portion of the placement portion 140 along the longitudinal direction. The guiding portion 143 is able to guide the movement of a pressing member 151, to be described below, of the moving device 150. The guiding portion 143 includes, for example, a first guide member 143a and a second guide member 143b.

The first guide member 143a is provided at one edge portion of the placement portion 140 along the longitudinal direction. The first guide member 143a is formed in a plate shape projecting from the upper surface of the placement portion 140. The first guide member 143a extends, for example, from the vicinity of one end to the vicinity of the other end of the placement portion 140 in the longitudinal direction.

The second guide member 143b is provided at the other edge portion of the placement portion 140 along the longitudinal direction. The second guide member 143b is formed in a plate shape projecting from the upper surface of the placement portion 140. The second guide member 143b extends, for example, from the vicinity of one end to the vicinity of the other end of the placement portion 140 in the longitudinal direction.

The moving device 150 includes the pressing member 151 and a driving portion 152. The pressing member 151 is supported on an upper surface 140a of the placement portion 140 so as to be movable along the upper surface 140a. The pressing member 151 is disposed between the first guide member 143a and the second guide member 143b.

The pressing member 151 is formed in, for example, a shape elongated in one direction. The pressing member 151 is supported by the placement portion 140 so as to be movable in the longitudinal direction of the placement portion 140. Specifically, one end of the pressing member 151 in the longitudinal direction is disposed at one end of the placement portion 140 in the lateral direction, and the other end of the pressing member 151 in the longitudinal direction is disposed at the other end of the placement portion 140 in the lateral direction.

The pressing member 151 is provided with the guided portion 121 of the second returning device 120.

As illustrated in FIG. 9, the driving portion 152 is configured to move the pressing member 151 to press the package 5 with the pressing member 151 so that the package 5 can be fed into the second chute 102. The driving portion 152 includes, for example, a wire 152a and the winding device 152b for winding the wire 152a. One end of the wire 152a is fixed to a surface of the pressing member 151 facing the package 5. For example, a plurality of the wires 152a is provided.

The winding device 152b is accommodated, for example, in the fifth member 131. To the winding device 152b, the other end of the wire 152a is fixed. The winding device 152b biases the wire 152a in the winding direction.

The moving device 150 configured as described above moves the pressing member 151 by winding the wire 152a by the winding device 152b, thereby moving the pressing member 151 along the upper surface 140a of the placement portion 140.

In addition, the wire 152a and the winding device 152b are configured such that the pressing member 151 can press the package 5 placed on the upper surface 140a to move the package 5 to feed the packages 5 into the second chute 102. For example, the wire 152a and the winding device 152b are configured such that the pressing member 151 can move between a retraction position (first position) P7 and a feeding position (second position) P8.

The retraction position P7 is a position of the pressing member 151 before the wire 152a is wound by the winding device 152b. The retraction position P7 is a position of the pressing member 151 where the pressing member 151 does not obstruct the placement of the package 5 on the conveyance apparatus 40A by the induction 90. The retraction position P7 is, for example, one end of the upper surface 140a opposite to the fifth member 131 in the longitudinal direction.

The feeding position P8 is a position of the pressing member 151 where the pressing member 151 feeds the package 5 placed on the placement portion 140 into the second chute 102. The feeding position P8 is, for example, one end of the placement portion 140 on the fifth member 131 side.

The locking device 160 is able to fix the pressing member 151 at the retraction position P7. In addition, the locking device 160 is able to release the fixation of the packages 5 at the retraction position P7 when a predetermined operation is performed from the outside. For example, the locking device 160 has a configuration similar to that of the second locking device 58. Therefore, components of the locking device 160 having similar functions to those of the second locking device 58 are denoted by the same reference signs as those of the second locking device 58, and the description thereof is not repeated.

The locking device 160 includes, for example, an engaged portion 57 provided on the pressing member 151 and a second locking device 58 which is provided on the base portion 130 and with which the engaged portion 57 is engaged when the pressing member 151 is at the retraction position P7.

In the conveyance apparatus 40A configured as described above, when the second releasing device 82 is driven at the timing of feeding the package 5 into the second chute 102, the engagement between the engaging member 58b of the second locking device 58 and the engaged portion 57 is released, so that the pressing member 151 is moved from the retraction position P7 to the feeding position P8. In the course of this movement, the pressing member 151 moves the package 5 by pressing the package 5 to feed the package 5 into the second chute 102.

Note that in the above-described conveyance apparatus 40A, the configuration including the plate-shaped placement portion 140 and the pressing member 151 that movably supports the placement portion 140 has been described as an example, but the present invention is not limited thereto. In another example, the conveyance apparatus 40A may be configured such that the conveyance assisting apparatus 50 used in the conveyance apparatus 40 is supported on the rail 30 by wheels 34.

In the above example, the configuration of the conveyance apparatus 40, in which the second placement portion 52 includes the placement member 54 is used as an example, but the present invention is not limited thereto. In another example, the second placement portion 52 may be, for example, a plate member slidably supported by the second base portion 51 instead of the placement member 54. The plate member is configured to be slidable, by a support portion such as the second rail 55, between a position where the plate member covers the first placement portion 44 and a position on the second chute 102 side where the plate member can feed the package 5 into the second chute 102. Then, the plate member is moved by, the moving device, for example, between a position where the plate member covers the first placement portion 44 and a position where the plate member can feed the package 5 into the second chute 102. The conveyance apparatus 40 configured as described above slides the plate member of the second placement portion 52 to move the plate member and the package 5 integrally. Then, when the sliding of the plate member is stopped, the package 5 placed on the plate member is moved by inertia and fed into the second chute 102.

In the case where the second placement portion 52 has a configuration, in which the second placement portion 52 includes a plate member on the placement member 54, a projecting portion 62 is provided on an upper surface of the plate member which is a placement surface on which the package 5 is placed. The projecting portion 62 is formed in a shape extending along the second direction intersecting the first direction which is a moving direction when the plate member moves from the position where the plate member covers the first placement portion 44 to the position where the plate member can feed the package 5 into the second chute 102. The projecting portion 62 is provided, for example, at one end of the upper surface of the plate member on the second fixing member 51b side, and is configured, for example, to be parallel to the width direction of the plate member.

In addition, in the above-described example, the pair of plate members 45 is not limited to the configuration in which they are supported by the first base portion 42 rotatably by the third member 42c and the fourth member 42d. The pair of plate members 45 may be supported by the first base portion 42 rotatably by, for example, rotation shafts that are members separate from the third member 42c and the fourth member 42d.

As described above, according to the package sorting apparatus 10 according to the modification of the present embodiment, the second chutes 102 can be disposed on the side of the rail 30, so that the degree of freedom in the arrangement of the second chutes 102 can be improved.

According to the package sorting apparatus of at least one embodiment described above, the degree of freedom in the arrangement of chutes can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A conveyance assisting apparatus comprising:
   a placement portion having a placement surface on which a package is placed;
   a base portion fixed to a conveyance apparatus including a door portion that is configured to be opened and closed between a closed position where the package is placed on the door portion and an open position where the package is dropped;
   a support portion that is provided on the base portion and supports the placement portion so that the placement portion is movable in a first direction between a first position where the placement portion covers the door portion and a second position where the placement portion uncovers the door portion;
   a moving device that is provided on the base portion and is configured to move the placement portion; and
   a projecting portion that is provided on the placement surface and extends in a second direction intersecting the first direction.

2. The conveyance assisting apparatus according to claim 1, wherein
   the placement portion is configured to be deformable between a developed state in which the package is placed on the placement portion and a wound state, and
   the moving device is a winding device that is configured to wind the placement portion from the developed state to the wound state.

3. A conveyance apparatus comprising,
   a conveyance apparatus main body including a first base portion and a door portion that is supported by the first base portion so as to be rotatable and that is configured to open and close between a closed position where a package is placed on the door portion and an open position where the package is dropped; and
   a conveyance assisting apparatus including:
      a placement portion having a placement surface on which a package is placed,
      a second base portion fixed to the conveyance apparatus main body,
      a support portion that is provided on the second base portion and supports the placement portion so that the placement portion is movable in a first direction between a first position where the placement portion covers the door portion and a second position where the placement portion uncovers the door portion,
      a moving device that is provided on the second base portion and is configured to move the placement portion, and
      a projecting portion provided on the placement surface and extends in a second direction intersecting the first direction.

4. A package sorting apparatus comprising:
   a rail;
   a first chute provided below the rail;
   a second chute provided on a side of the rail;
   a conveyance apparatus including a conveyance apparatus main body and a conveyance assisting apparatus,
      the conveyance apparatus main body including:
      a first base portion movably supported by the rail and
      a door portion that is rotatably supported by the first base portion and that is configured to be opened and closed between a closed position where a package is placed on the door portion and an open position where the package is fed into the first chute,
      the conveyance assisting apparatus including:
      a placement portion having a placement surface on which a package is placed,
      a second base portion fixed to the conveyance apparatus main body,
      a support portion that is provided on the second base portion and supports the placement portion so that the placement portion is movable in a first direction between a first position where the placement portion covers the door portion and a second position where the placement portion uncovers the door portion to feed the package into the second chute,
      a moving device that is provided on the second base portion and is configured to move the placement portion, and
      a projecting portion that is provided on the placement surface and extends in a second direction intersecting the first direction;
   a first device that is provided along the rail and is configured to open the door portion at a timing when the conveyance apparatus passes through the first device;
   a second device that is provided along the rail and is configured to operate the moving device at a timing when the conveyance apparatus passes through the second device; and
   a control device that is configured to control the first device and the second device.

5. The package sorting apparatus according to claim 4, wherein the moving device includes a biasing portion that is configured to bias the placement portion from the first position toward the second position, the placement portion includes an engaged portion and a guided portion, the second base portion includes an engaging portion that engages with the engaged portion when the placement portion is at the first position to hold the placement portion at the first position, and the rail includes a guide rail that guides the placement portion from the second position to the first position by abutting on the guided portion as the conveyance apparatus moves.

\* \* \* \* \*